(12) United States Patent
Kinomura

(10) Patent No.: US 10,232,720 B1
(45) Date of Patent: Mar. 19, 2019

(54) VEHICLE

(71) Applicant: Toyota Jidosha Kabushiki Kaisha, Toyota-shi, Aichi-ken (JP)

(72) Inventor: Shigeki Kinomura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 16/020,369

(22) Filed: Jun. 27, 2018

(30) Foreign Application Priority Data

Aug. 29, 2017 (JP) ................. 2017-164720

(51) Int. Cl.
*H01R 4/66* (2006.01)
*B60L 11/18* (2006.01)
*H02G 3/06* (2006.01)
*F16B 2/10* (2006.01)
*H02J 7/00* (2006.01)

(52) U.S. Cl.
CPC ........ *B60L 11/1818* (2013.01); *H02G 3/0625* (2013.01); *B60L 11/1838* (2013.01); *F16B 2/10* (2013.01); *H02J 7/0042* (2013.01)

(58) Field of Classification Search
CPC ............... H01R 23/688; H01R 13/447; H01R 13/6335; H01R 13/562; H01R 13/62933; H01R 39/00
USPC ....... 439/101, 135, 144, 142, 134, 483, 447, 439/310.3
See application file for complete search history.

(56) References Cited

U.S. PATENT DOCUMENTS

| | | | | |
|---|---|---|---|---|
| 9,147,972 B2 * | 9/2015 | Ohmura | ............... | H01R 13/641 |
| 9,184,543 B2 * | 11/2015 | Nakajima | ........... | B60L 11/1818 |
| 9,263,830 B2 * | 2/2016 | Sugiyama | ........... | B60L 11/1818 |
| 9,463,702 B2 * | 10/2016 | Fukushima | .......... | H01R 13/506 |
| 9,509,095 B2 * | 11/2016 | Ohmura | ............... | H01R 13/639 |

FOREIGN PATENT DOCUMENTS

| | | |
|---|---|---|
| JP | 2014-204494 A | 10/2014 |
| JP | 2015-072855 A | 4/2015 |

\* cited by examiner

*Primary Examiner* — Phuong Chi T Nguyen
(74) *Attorney, Agent, or Firm* — Dinsmore & Shohl LLP

(57) ABSTRACT

Provided is a vehicle in which an electric power storage device is mounted and which is configured to execute external charging. The vehicle includes an inlet connected to a charging connector, a cable lock mechanism disposed near the inlet and switching between a lock state and an unlock state, and a control device selecting a first mode in which the electric power storage device is allowed to be charged at a first current value in a case where the cable lock mechanism is in the lock state with the charging connector and the inlet connected to each other and selecting a second mode in which the electric power storage device is allowed to be charged at a second current value in a case where the cable lock mechanism is in the unlock state with the charging connector and the inlet connected to each other.

4 Claims, 7 Drawing Sheets

FIG. 2
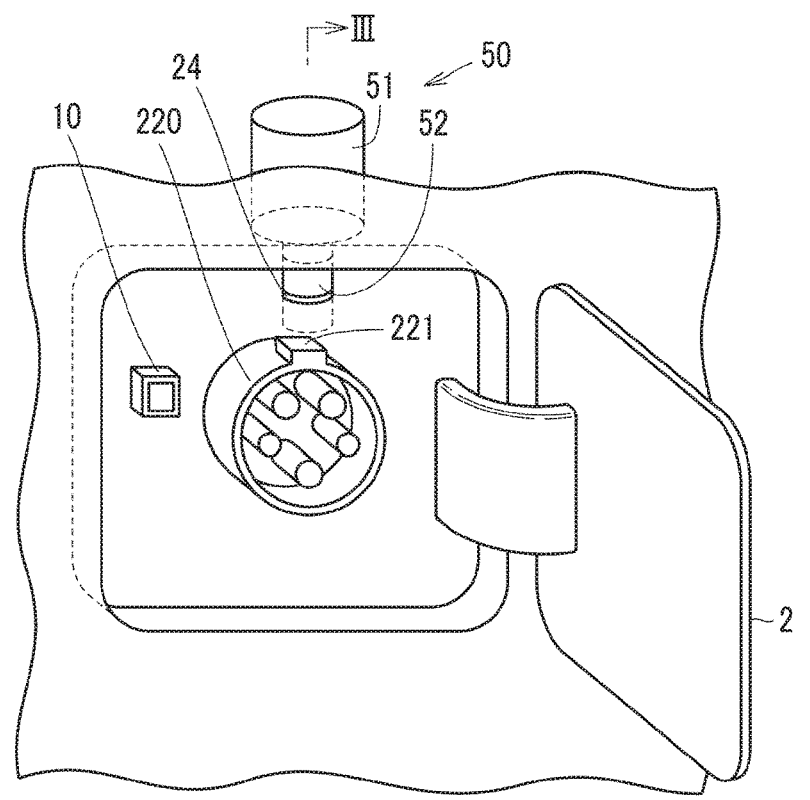
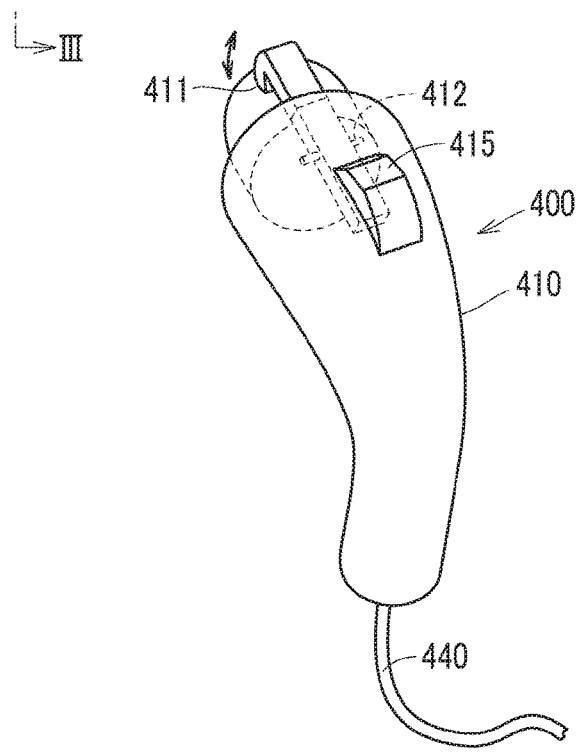

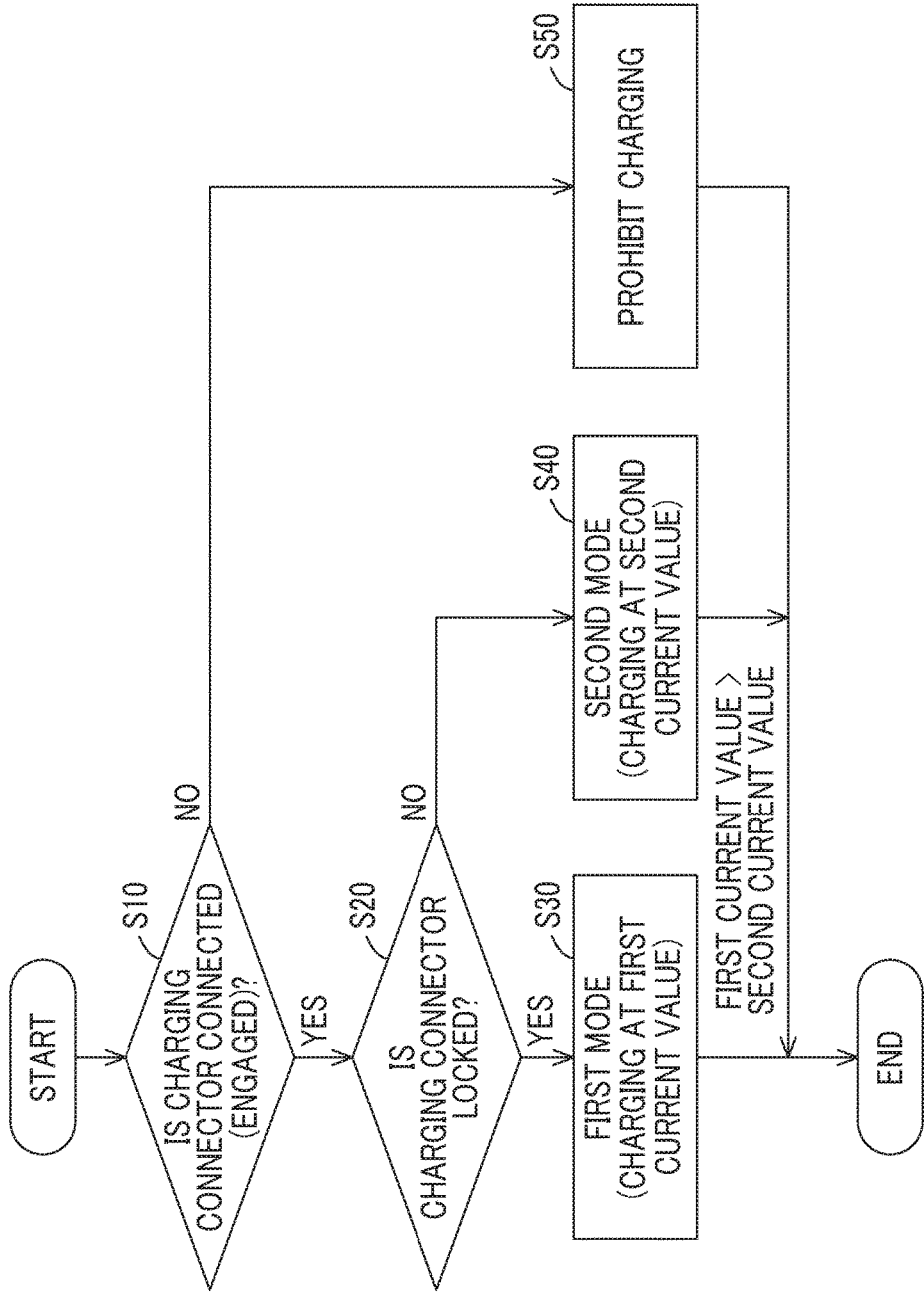

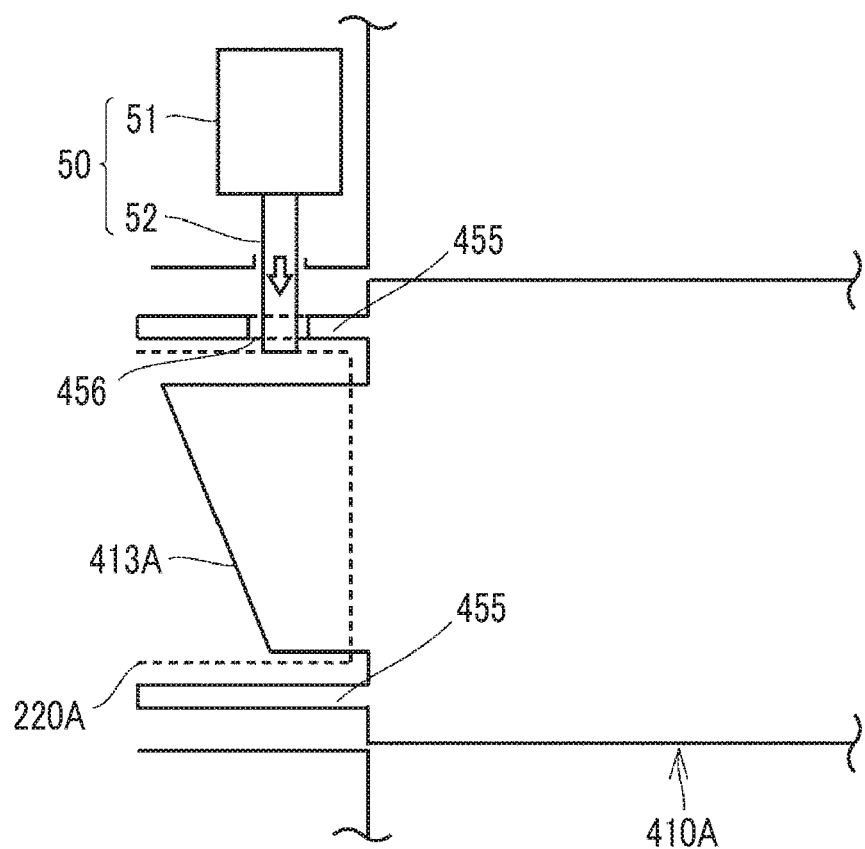

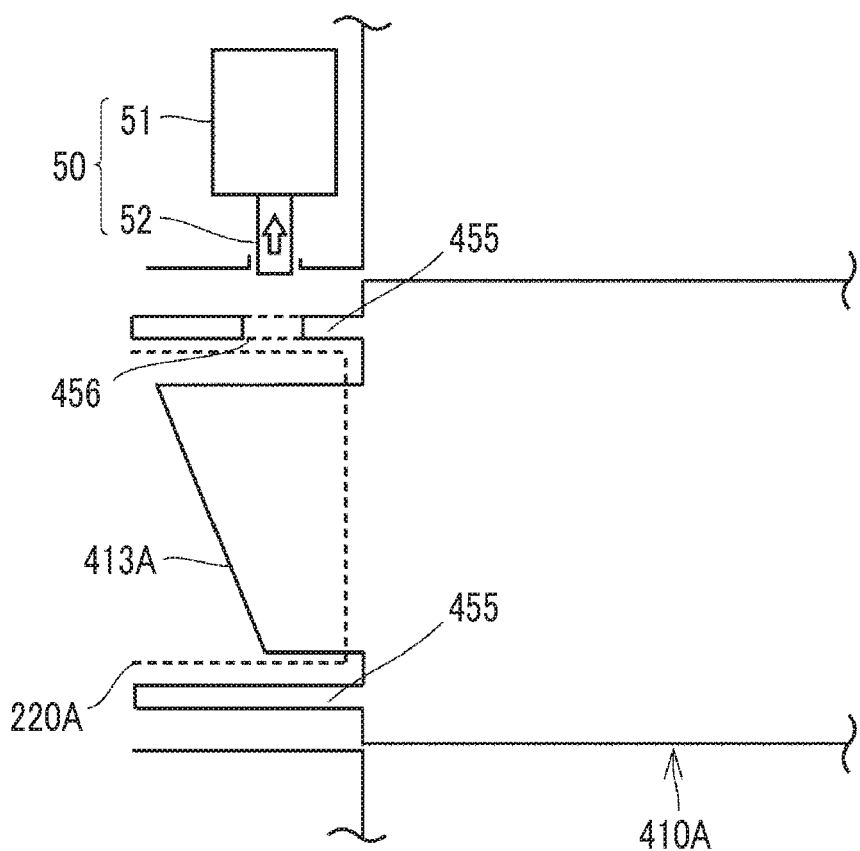

VEHICLE

CROSS-REFERENCE TO RELATED APPLICATIONS

This application claims priority to Japanese Patent Application No. 2017-164720 filed on Aug. 29, 2017, which is incorporated herein by reference in its entirety including the specification, drawings and abstract.

BACKGROUND

1. Technical Field

The present disclosure relates to a vehicle on which external charging is performed, the external charging being charging of an electric power storage device with electric power supplied by a charging cable.

2. Description of Related Art

A vehicle that is externally charged is disclosed in Japanese Unexamined Patent Application Publication No. 2015-72855 (JP 2015-72855 A). In the vehicle, a charging connector of a charging cable and an inlet are engaged with each other by a lock pin for preventing removal of the charging connector from the inlet. The vehicle allows external charging when the charging connector and the inlet are engaged with each other by the lock pin and prohibits external charging when the charging connector and the inlet are not engaged with each other by the lock pin. As a result, removal of the charging connector from the inlet during external charging is prevented.

SUMMARY

Vehicles on which external charging is performed include those provided with a cable lock mechanism so that the state where the charging connector and the inlet are engaged with each other (hereinafter, referred to as an "engagement state") is not released for third-party mischief or the like. The cable lock mechanism is configured to switch between a lock state where removal of the charging connector from the inlet is restricted and an unlock state where removal of the charging connector from the inlet is allowed.

In a vehicle provided with the cable lock mechanism, it is assumed that the charging connector is removed from the inlet in a state where a current with a predetermined value or more (hereinafter, also referred to as a "large current") flows (hereinafter, also referred to as "removal with the large current") once external charging is allowed in a case where the cable lock mechanism is in the unlock state. In this case, the area of contact between the charging connector and the inlet may be reduced during removal of the charging connector from the inlet, and this may result in a phenomenon in which the large current locally flows and an allowable temperature is exceeded.

Once external charging is prohibited in a case where the cable lock mechanism is in the unlock state, user convenience may be impaired although the removal with the large current can be prevented. Specifically, for example, no external charging is executed, against a user's will and despite the engagement state of the charging connector and the inlet, in a case where the user forgets about operation for putting the cable lock mechanism into the lock state or in a case where the lock state is not achieved due to malfunction of the cable lock mechanism or the like.

The present disclosure provides a vehicle that can be externally charged, with the removal with the large current suppressed, in a case where the cable lock mechanism is in the unlock state.

An aspect of the present disclosure relates to a vehicle in which an electric power storage device is mounted and which is configured to execute external charging for charging the electric power storage device with electric power supplied by a charging cable. The vehicle includes an inlet, a cable lock mechanism, and a control device. The inlet is configured to be connected to a charging connector disposed at a tip of the charging cable. The cable lock mechanism is disposed near the inlet and is configured to switch between a lock state where removal of the charging connector from the inlet is restricted and an unlock state where removal of the charging connector from the inlet is allowed. The control device is configured to select a first mode in which the electric power storage device is allowed to be charged at a first current value in a case where the cable lock mechanism is in the lock state with the charging connector and the inlet connected to each other, and select a second mode in which the electric power storage device is allowed to be charged at a second current value less than the first current value in a case where the cable lock mechanism is in the unlock state with the charging connector and the inlet connected to each other.

According to the aspect of the present disclosure, charging of the electric power storage device is allowed even when the cable lock mechanism is in the unlock state. The charging is allowed at the second current value (current value equal to or less than a predetermined value: small current), which is less than the first current value (current value equal to or greater than the predetermined value: large current) allowed in a case where the cable lock mechanism is in the lock state. Therefore, charging of the electric power storage device is allowed, at the second current value, even in a case where the cable lock mechanism is in the unlock state and removal with the large current can be suppressed even in a case where the charging connector is removed from the inlet.

In the vehicle according to the aspect of the present disclosure, the inlet may be configured to be engaged with the charging connector. The control device may be configured to select the first mode in a case where the cable lock mechanism is in the lock state with the charging connector and the inlet engaged with each other. The control device may be configured to select the second mode in a case where the cable lock mechanism is in the unlock state with the charging connector and the inlet engaged with each other.

According to the aspect of the present disclosure, the first mode and the second mode are selected in accordance with the states of the cable lock mechanism on the premise that the charging connector and the inlet are engaged with each other. The charging connector and the inlet remain engaged with each other even in a case where the cable lock mechanism is in the unlock state. Accordingly, the charging connector is unlikely to be removed from the inlet, even in a case where external charging is performed with the cable lock mechanism in the unlock state, with the exception of a case where, for example, the engagement state is intentionally released. Therefore, removal of the charging connector from the inlet during external charging with the small current can also be suppressed.

In the vehicle according to the aspect of the present disclosure, the first current value may be a current value greater than 16 amperes and the second current value may be a current value less than 16 amperes.

According to the aspect of the present disclosure, flowing of a current greater than 16 amperes can be suppressed in the unlock state. Accordingly, removal with the large current does not occur even in a case where the charging connector is removed from the inlet during external charging.

In the vehicle according to the aspect of the present disclosure, the control device may be configured to execute the charging of the electric power storage device based on a selected charge mode.

According to the aspect of the present disclosure, external charging can be executed, with removal with the large current suppressed, in the unlock state of the cable lock mechanism.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 2 is a diagram illustrating the structure of a charging cable, an inlet, and the vicinity thereof;

FIG. 5 is a flowchart with which an ECU determines the availability of charging from an external electric power supply device to an electric power storage device;

FIG. 6 is another sectional view of the inlet and the charging connector in the lock state of the cable lock mechanism; and FIG. 7 is another sectional view of the inlet and the charging connector in the unlock state of the cable lock mechanism.

DETAILED DESCRIPTION OF EMBODIMENTS

Figure 1:
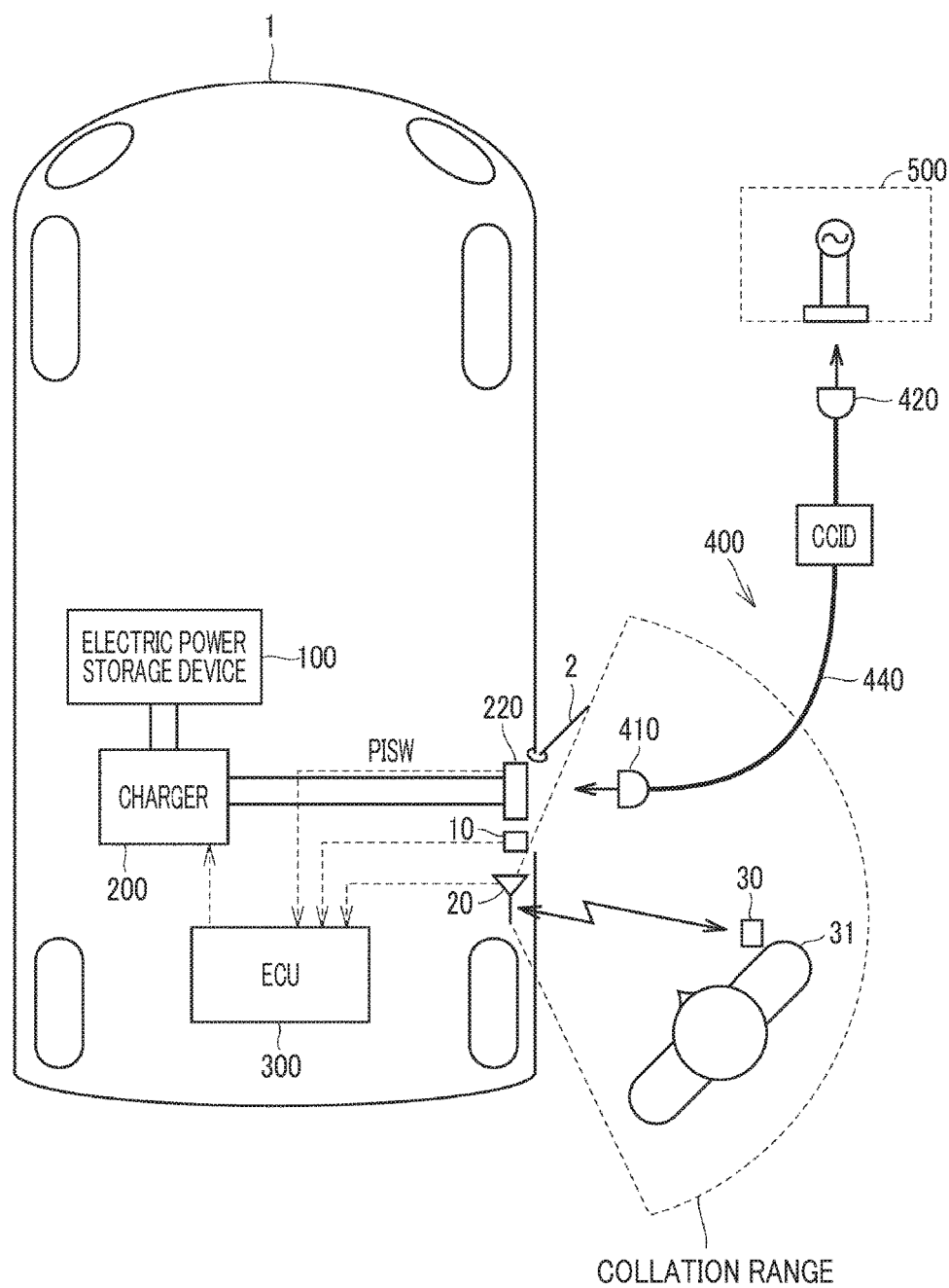
FIG. 1 is an overall block diagram of a vehicle.

Hereinafter, the present embodiment will be described in detail with reference to accompanying drawings. In the drawings, the same reference numerals will be used to refer to the same or corresponding parts so that the same description is not repeated.

FIG. 1 is an overall block diagram of a vehicle 1 according to the present embodiment. The vehicle 1 travels by driving a traveling motor (not illustrated) by using electric power stored in an electric power storage device 100.

The vehicle 1 is provided with the electric power storage device 100 storing the direct current electric power for driving the traveling motor and an electronic control unit (ECU) 300 performing vehicle control. The ECU 300 is a computer including, for example, an internal central processing unit (CPU) and an internal memory.

The vehicle 1 is configured such that the electric power storage device 100 can be charged with electric power (hereinafter, also referred to as "external electric power") supplied via a charging cable 400 from an electric power supply device (hereinafter, also referred to as an "external electric power supply device") 500 disposed outside the vehicle 1. In the present embodiment, a case will be described where the external electric power is alternating current electric power.

Specifically, the vehicle 1 is provided with an inlet 220 configured to be connectable to a connecting portion 413 disposed at a tip of a charging connector 410 of the charging cable 400 and formed in a substantially cylindrical shape and a charger 200 disposed between the inlet 220 and the electric power storage device 100. In the present embodiment, the inlet 220 is disposed in the rear side surface of the vehicle body. The charger 200 outputs the external electric power (alternating current electric power) received by the inlet 220 to the electric power storage device 100 after converting the external electric power into electric power (direct current electric power) with which the electric power storage device 100 can be charged.

A cable lock switch 10 is disposed near (at a position adjacent to) the inlet 220. The cable lock switch 10 outputs, to the ECU 300 and in response to user operation, a request for switching between fixing (lock) and unfixing (unlock) between the charging connector 410 and the inlet 220.

The inlet 220 and the cable lock switch 10 are normally covered with a charging lid 2. Once the charging lid 2 is opened, a user can connect the charging connector 410 of the charging cable 400 to the inlet 220 and operate the cable lock switch 10.

Also disposed near the inlet 220 is an antenna 20 for performing communication between the ECU 300 and an electronic key 30 that can be carried around by a user 31. In a case where the electronic key 30 is present in the communication coverage (hereinafter, referred to as the "collation range", refer to FIG. 1) of the antenna 20, the ECU 300 is capable of performing communication with the electronic key 30 by using the antenna 20. In a case where the electronic key 30 is not present in the collation range, no communication can be performed between the ECU 300 and the electronic key 30.

The ECU 300 performs, based on information received by the antenna 20, processing (hereinafter, also referred to as "collation processing") for determining whether or not the collation condition that the electronic key 30 present in the collation range is a regular user's is satisfied. The ECU 300 determines "collatable" when the collation condition is satisfied and determines "uncollatable" when the collation condition is not satisfied.

FIG. 2 is a diagram illustrating the structure of the charging cable 400, the inlet 220, and the vicinity thereof. The vehicle 1 is also provided with a cable lock mechanism 50 and a pressing force detection sensor 24.

The cable lock mechanism 50 is disposed above the inlet 220 (near the inlet 220). The cable lock mechanism 50 is configured to switch between a lock state where removal of the charging cable 400 from the inlet 220 is restricted and an unlock state where removal of the charging cable 400 from the inlet 220 is allowed.

Specifically, the cable lock mechanism 50 is provided with a lock bar 52 sliding upward and downward and an electromagnetic actuator 51 causing the lock bar 52 to slide. The pressing force detection sensor 24 is disposed in the lower end portion of the lock bar 52.

The charging cable 400 is provided with the charging connector 410, a plug 420, and an alternating current electric power line 440. The connecting portion 413 is disposed at the tip of the charging connector 410 and connected to the inlet 220 in an electrically conductible manner. The charging connector 410 has a link 411. The link 411 is attached rotatable around a shaft 412. A projecting portion engaged with a projection 221 of the inlet 220 is disposed at a first end of the link 411, and a push button 415 is disposed at a second end of the link 411. The link 411 is elastically biased with respect to the body of the charging connector 410 by a spring 414 (refer to FIGS. 3 and 4). The charging connector 410 is provided with a detection circuit (not illustrated) for detecting connection of the charging cable 400. Once the charging connector 410 and the inlet 220 are electrically connected to each other, a connection signal (proximity detection signal) PISW that indicates the state where the charging cable 400 is electrically connected is transmitted to the ECU 300 via the inlet 220. Upon receiving the PISW, the ECU 300 determines that the charging connector 410 and the inlet 220 remain electrically connected to each other.

The plug 420 is configured to be connectable to the external electric power supply device 500. The alternating current electric power line 440 connects the charging connector 410 and the plug 420 to each other.

Figure 3:
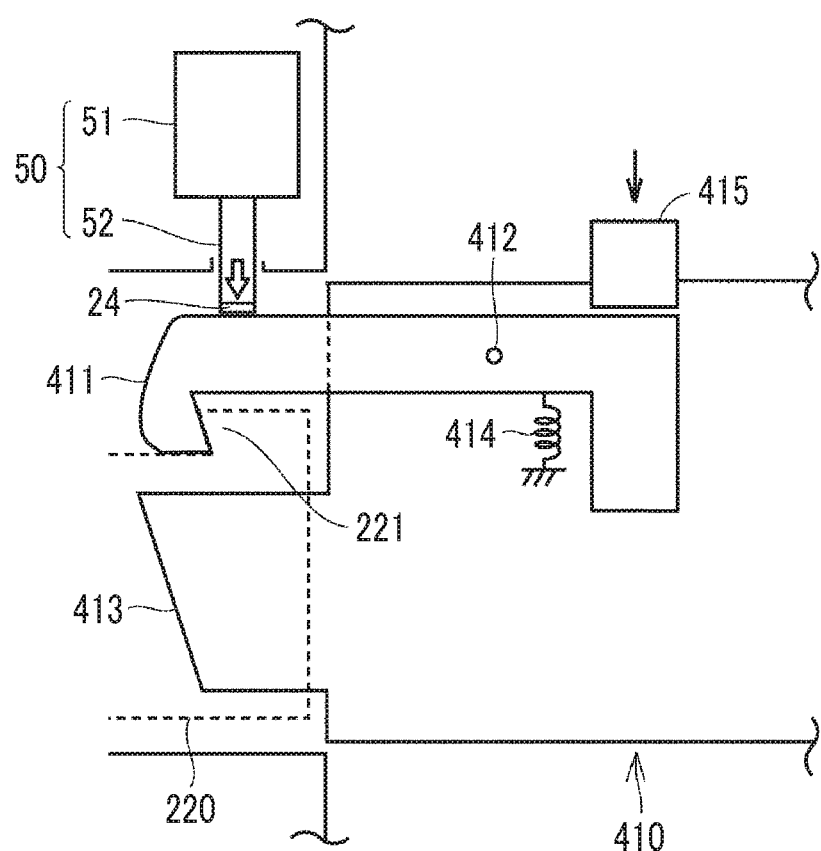
FIG. 3 is a sectional view of the inlet and a charging connector in a lock state of a cable lock mechanism.
Figure 4:
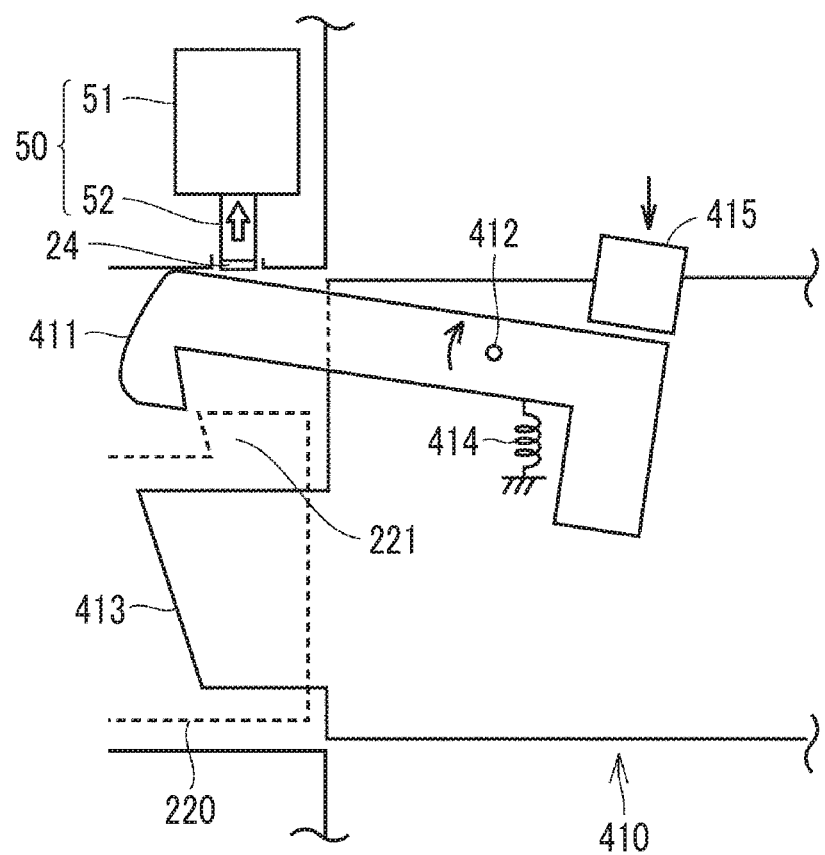
FIG. 4 is a sectional view of the inlet and the charging connector in an unlock state of the cable lock mechanism.

FIGS. 3 and 4 are sectional views taken along line III-III of FIG. 2. FIG. 3 is a sectional view of the inlet 220 and the charging connector 410 in the lock state of the cable lock mechanism 50. FIG. 4 is a sectional view of the inlet 220 and the charging connector 410 in the unlock state of the cable lock mechanism 50. A mechanism for engagement and fixing between the charging connector 410 and the inlet 220 will be described below with reference to FIGS. 3 and 4.

In FIG. 3, once the charging connector 410 is inserted into the inlet 220, the charging connector 410 and the inlet 220 are electrically connected to each other and the projecting portion of the link 411 is engaged with the projection 221 of the inlet 220 (hereinafter, also referred to as an "engagement state"). Accordingly, the charging connector 410 is not released from the inlet 220 in this state.

In the lock state of the cable lock mechanism 50, the lock bar 52 slides downward and is fixed at a position in contact with the upper surface of the link 411. As a result, rotation of the link 411 is suppressed by the lock bar 52 even when the push button 415 is pushed, and the projecting portion of the link 411 does not rise and is not released from the projection 221 of the inlet 220. In other words, in this state, the charging connector 410 cannot be removed from the inlet 220 even when a user pushes the push button 415.

Once the lock state results from engagement between the charging connector 410 and the inlet 220, the pressing force detection sensor 24 is moved with the lower end portion of the lock bar 52 to a position where disengagement of the projecting portion of the link 411 is blocked. In this case, the pressing force detection sensor 24 abuts and is pressed against the upper surface side of the link 411. A pressing force applied to the pressing force detection sensor 24 is converted into an electric signal and the electric signal is sent to the ECU 300. The ECU 300 determines that the lock state is in progress when the pressing force applied to the pressing force detection sensor 24 is equal to or greater than a predetermined value. The ECU 300 determines that the unlock state is in progress when the pressing force applied to the pressing force detection sensor 24 is less than the predetermined value.

In the unlock state illustrated in FIG. 4, the lock bar 52 slides upward and is fixed at a position where rotation of the link 411 is not suppressed. As a result, rotation of the link 411 is not suppressed by the lock bar 52, and thus the link 411 rotates around the shaft 412 and the projecting portion disposed in the opposite end portion rises once the push button 415 is pushed. As a result, the projecting portion of the link 411 is released from the projection 221 of the inlet 220 and the charging connector 410 can be removed from the inlet 220. In other words, in this state, the charging cable 400 can be removed from the inlet 220 by a user pushing the push button 415.

In a case where operation of the cable lock switch 10 is detected, the ECU 300 performs the collation processing described above and controls the cable lock mechanism 50 in accordance with the result of the collation processing. More specifically, in a case where "collatable" is determined by the collation processing, since the ECU 300 estimates that the regular user 31 operated the cable lock switch 10 in the collation range illustrated in FIG. 1, and the ECU 300 accepts the operation of the cable lock switch 10. In a case where the operation of the cable lock switch 10 is accepted, the ECU 300 outputs a lock command to the actuator 51 when the state of the cable lock mechanism 50 is the unlock state and outputs an unlock command to the actuator 51 when the state of the cable lock mechanism 50 is the lock state.

In a case where "uncollatable" is determined by the collation processing, the ECU 300 estimates that someone other than the regular user 31 operated the cable lock switch 10 and does not accept the operation of the cable lock switch 10.

It is assumed that the vehicle 1 configured as described above is externally charged with a current with a predetermined value or more (hereinafter, also referred to as a "large current") flowing so that the external charging is completed early. In a case where the cable lock mechanism 50 is in the unlock state, however, the engagement state of the charging connector 410 and the inlet 220 may be released due to third-party mischief or the like. Accordingly, it is assumed that the charging connector 410 is removed from the inlet 220 in a state where the large current flows (hereinafter, also referred to as "removal with the large current") once external charging is allowed in a case where the cable lock mechanism 50 is in the unlock state. In this case, the area of contact between the charging connector 410 and the inlet 220 may be reduced during removal of the charging connector 410 from the inlet 220, and this may result in a phenomenon in which the large current locally flows and an allowable temperature is exceeded.

Once external charging is prohibited in a case where the cable lock mechanism 50 is in the unlock state, user convenience may be impaired although the removal with the large current can be prevented. Specifically, for example, no external charging is executed, against a user's will and despite the engagement state of the charging connector 410 and the inlet 220, in a case where the user 31 forgets about operation for putting the cable lock mechanism 50 into the lock state or in a case where the lock state is not achieved due to malfunction of the cable lock mechanism 50 or the like.

In the present embodiment, the ECU 300 allows external charging with the large current in a case where the cable lock mechanism 50 is in the lock state. In a case where the cable lock mechanism 50 is in the unlock state, the ECU 300 allows external charging with a current with a value less than the predetermined value (hereinafter, also referred to as a "small current") without prohibiting external charging.

As a result, charging of the electric power storage device 100 is still allowed, with the small current, even when the cable lock mechanism 50 is in the unlock state. By charging being performed with the small current, the removal with the large current described above does not occur even when the charging connector 410 is removed from the inlet 220.

FIG. 5 is a flowchart with which the ECU 300 determines the availability of charging from the external electric power supply device 500 to the electric power storage device 100. This flowchart is repeatedly executed at a predetermined cycle when the charging lid 2 is opened.

In Step (hereinafter, simply referred to as "S") 10, the ECU 300 determines whether the charging connector 410 and the inlet 220 are engaged with each other. In a case where the ECU 300 determines that the charging connector 410 and the inlet 220 are not engaged with each other (NO in S10), the ECU 300 prohibits charging of the electric power storage device 100 (S50). As a result, in a case where the charging connector 410 and the inlet 220 are not in the engagement state, charging is prohibited and the removal with the large current is reliably suppressed.

In a case where the ECU 300 determines that the charging connector 410 and the inlet 220 are in the engagement state (YES in S10), the ECU 300 determines the state of the cable lock mechanism 50 (S20). Specifically, the ECU 300 determines whether the cable lock mechanism 50 is in the lock state or the unlock state by using information from the pressing force detection sensor 24 disposed in the lower end portion of the lock bar 52. In a case where the ECU 300 determines that the cable lock mechanism 50 is in the lock state (YES in S20), the ECU 300 selects a first mode (S30). Charging of the electric power storage device 100 with the large current is allowed in the first mode. The large current is a charging current that is used in a case where charging of the electric power storage device 100 is performed from the external electric power supply device 500 and a current with a predetermined value or more at which the removal with the large current can occur when the charging connector 410 is removed from the inlet 220 during external charging. For example, the large current is a current of 16 amperes or more. The large current can be regarded as the "first current value" according to the present disclosure.

In a case where the ECU 300 determines that the cable lock mechanism 50 is in the unlock state (NO in S20), the ECU 300 selects a second mode (S40). Charging of the electric power storage device 100 with the small current less than the large current is allowed in the second mode. The small current is a charging current that is used in a case where charging of the electric power storage device 100 is performed from the external electric power supply device 500 and a current with a value less than the predetermined value at which the removal with the large current cannot occur when the charging connector 410 is removed from the inlet 220 during external charging. For example, the small current has a current value of less than 16 amperes. The small current can be regarded as the "second current value" according to the present disclosure.

The ECU 300 terminates the processing after determining the availability of charging from the external electric power supply device 500 to the electric power storage device 100 or the charge mode selection.

As described above, in the present embodiment, the ECU 300 first determines the engagement state of the charging connector 410 and the inlet 220. In a case where the charging connector 410 and the inlet 220 are not in the engagement state, the ECU 300 prohibits charging from the external electric power supply device 500 to the electric power storage device 100. As a result, the removal with the large current can be reliably suppressed.

In a case where the ECU 300 determines that the charging connector 410 and the inlet 220 are in the engagement state, the ECU 300 determines the state of the cable lock mechanism 50. The ECU 300 allows external charging with the large current when the cable lock mechanism 50 is in the lock state.

The ECU 300 performs external charging with the small current when the cable lock mechanism 50 is in the unlock state. Therefore, the electric power storage device 100 is charged even in a case where a user forgets about operation for putting the cable lock mechanism 50 into the lock state or a case where the lock state is not achieved due to malfunction of the cable lock mechanism 50 or the like. Accordingly, external charging can be executed, with the removal with the large current suppressed, in the unlock state of the cable lock mechanism 50.

First Modification Example

In the embodiment, the ECU 300 determines the state of the cable lock mechanism 50 by using a signal from the pressing force detection sensor 24 disposed in the lower end portion of the lock bar 52. However, the use of the signal from the pressing force detection sensor 24 is optional insofar as the cable lock mechanism 50 is capable of determining whether the cable lock mechanism 50 is in the lock state or the unlock state. For example, a press switch may be used instead of the pressing force detection sensor 24.

The use of the pressing force detection sensor is optional. For example, whether the cable lock mechanism 50 is in the lock state or the unlock state is determined from the operation position of the lock bar 52 operated by the actuator 51 in accordance with a state switching command that the ECU 300 issues to the cable lock mechanism 50. In this case, the ECU 300 determines that the cable lock mechanism 50 is in the lock state when the lock bar 52 is at a position defined as the lock state and determines that the cable lock mechanism 50 is in the unlock state when the lock bar 52 is at a position defined as the unlock state.

Second Modification Example

In the embodiment, the charging connector 410 has the link 411 and, once the charging connector 410 is inserted into the inlet 220, the projecting portion of the link 411 is engaged with the projection 221 of the inlet 220. Vehicles on which external charging is performed include those that are not provided with a mechanism for engagement between the charging connector 410 and the inlet 220 as described above. The present disclosure is also applicable to such vehicles, which will be described below. A second modification example is basically identical to the embodiment except the configuration of the inlet 220 and the charging connector 410. Accordingly, description of configuration will not be repeated with the exception of the configuration of an inlet 220A and a charging connector 410A.

FIG. 6 is a sectional view of the inlet 220A and the charging connector 410A in the lock state of the cable lock mechanism 50. The inlet 220A has a configuration in which the configuration of the projection 221 is excluded from the configuration of the inlet 220. The charging connector 410A has a configuration in which the configuration of the link 411 and the push button 415 is excluded from the configuration of the charging connector 410 with the configuration of a lock portion 455 added.

In FIG. 6, the lock portion 455 is disposed with a connecting portion 413A at a tip of the charging connector 410A. The lock portion 455 is formed in a substantially hollow cylindrical shape outside the outer peripheral surface of the connecting portion 413A. A hole 456 is formed in the upper side of the connecting portion 413A so that the lock bar 52 sliding downward is locked by being inserted.

Whether the cable lock mechanism 50 is in the lock state or the unlock state is determined from the operation position of the lock bar 52 operated by the actuator 51 in accordance with a state switching command that the ECU 300 issues to the cable lock mechanism 50.

In FIG. 6, once the charging connector 410A is inserted into the inlet 220A, the inlet 220 and the connecting portion 413A disposed at the tip of the charging connector 410A are connected to each other in an electrically conductible manner. In S10 of the flowchart that is illustrated in FIG. 5, the ECU 300 determines whether or not the charging connector 410A is connected to the inlet 220A. The lock portion 455 is inserted into the inlet 220A with the connecting portion 413A and the hole 456 formed in the lock portion 455 is positioned below the lock bar 52.

In FIG. 6, the lock bar 52 slides downward and is fixed at a position where the lock bar 52 is inserted into the hole 456 in the lock state of the cable lock mechanism 50. As a result, the charging connector 410A cannot be removed from the inlet 220A in this state.

FIG. 7 is a sectional view of the inlet 220A and the charging connector 410A in the unlock state of the cable lock mechanism 50. In FIG. 7, the lock bar 52 slides upward and is fixed in a state where the lock bar 52 is not inserted into the hole 456 in the unlock state of the cable lock mechanism 50. As a result, the charging connector 410A can be removed from the inlet 220A in this state.

The present disclosure may be applied to a vehicle configured as described above with the ECU 300 controlling the charging current of external charging by determining the state of connection between the charging connector 410A and the inlet 220A and the state of the cable lock mechanism 50.

The cable lock mechanism 50 and the lock portion 455 may be disposed below, for example, the inlet 220A insofar as the charging connector 410A and the inlet 220A can be put into a lock state by the cable lock mechanism 50 and the lock portion 455.

Third Modification Example

In the configuration of the embodiment and the second modification example, switching between the lock state and the unlock state of the cable lock mechanism 50 is performed in accordance with user operation on the cable lock switch 10. This is optional insofar as the switching between the lock state and the unlock state is possible. For example, switching to the lock state may be automatically performed in a case where the ECU 300 determines that the charging connector 410 (410A) and the inlet 220 (220A) remain electrically connected to each other. Switching to the unlock state may be performed after the elapse of a predetermined period, upon external charging completion, and so on.

It should be noted that the embodiment disclosed here is a non-restrictive example in all respects. The scope of the present disclosure is clarified by the scope of claims, not the description of the embodiment above, and includes every change within the meaning and scope equivalent to the claims.

What is claimed is:

1. A vehicle in which an electric power storage device is mounted and which is configured to execute external charging for charging the electric power storage device with electric power supplied by a charging cable, the vehicle comprising:
   an inlet configured to be connected to a charging connector disposed at a tip of the charging cable;
   a cable lock mechanism disposed near the inlet, the cable lock mechanism being configured to switch between a lock state where removal of the charging connector from the inlet is restricted and an unlock state where removal of the charging connector from the inlet is allowed; and
   an electronic control unit configured to
      select a first mode in which the electric power storage device is allowed to be charged at a first current value in a case where the cable lock mechanism is in the lock state with the charging connector and the inlet connected to each other, and
      select a second mode in which the electric power storage device is allowed to be charged at a second current value less than the first current value in a case where the cable lock mechanism is in the unlock state with the charging connector and the inlet connected to each other.

2. The vehicle according to claim 1, wherein:
   the inlet is configured to be engaged with the charging connector;
   the electronic control unit is configured to select the first mode in a case where the cable lock mechanism is in the lock state with the charging connector and the inlet engaged with each other; and
   the electronic control unit is configured to select the second mode in a case where the cable lock mechanism is in the unlock state with the charging connector and the inlet engaged with each other.

3. The vehicle according to claim 1, wherein:
   the first current value is a current value greater than 16 amperes; and
   the second current value is a current value less than 16 amperes.

4. The vehicle according to claim 1, wherein the electronic control unit is configured to execute the charging of the electric power storage device based on a selected charge mode.

* * * * *